US007263495B2

(12) United States Patent
Rodriguez

(10) Patent No.: US 7,263,495 B2
(45) Date of Patent: Aug. 28, 2007

(54) ORDER SCHEDULING SYSTEM AND METHODOLOGY

(75) Inventor: John Rodriguez, Capitola, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 860 days.

(21) Appl. No.: 09/865,916

(22) Filed: May 24, 2001

(65) Prior Publication Data

US 2003/0018502 A1 Jan. 23, 2003

(51) Int. Cl.
G06F 9/46 (2006.01)
(52) U.S. Cl. .......................................... 705/8
(58) Field of Classification Search ............ 705/7, 705/8
See application file for complete search history.

(56) References Cited

U.S. PATENT DOCUMENTS

| | | | | |
|---|---|---|---|---|
| 5,319,542 | A | 6/1994 | King et al. ............... 705/27 |
| 5,402,336 | A * | 3/1995 | Spiegelhoff et al. ......... 705/8 |
| 5,715,314 | A | 2/1998 | Payne et al. ............... 705/78 |
| 5,745,681 | A | 4/1998 | Levine et al. ............. 709/200 |
| 5,819,285 | A | 10/1998 | Damico et al. .......... 707/104.1 |
| 5,956,709 | A | 9/1999 | Xue ............................... 707/3 |
| 6,029,141 | A | 2/2000 | Bezos et al. ............... 705/27 |
| 6,317,722 | B1 | 11/2001 | Jacobi et al. ............... 705/14 |
| 6,594,641 | B1 * | 7/2003 | Southam ...................... 705/26 |
| 6,628,307 | B1 | 9/2003 | Fair ........................... 345/763 |
| 6,629,079 | B1 | 9/2003 | Spiegel et al. ............. 705/26 |
| 6,636,863 | B1 | 10/2003 | Friesen ...................... 707/102 |
| 2001/0042023 | A1 * | 11/2001 | Anderson et al. .......... 705/26 |
| 2002/0026373 | A1 * | 2/2002 | Kamath et al. ............. 705/26 |
| 2002/0107861 | A1 * | 8/2002 | Clendinning et al. ....... 707/101 |

FOREIGN PATENT DOCUMENTS

JP 10-40255 A * 2/1998

OTHER PUBLICATIONS

ATIS, hash function definition, T1.523-2001, Copyright © Alliance for Telecommunications Industry Solutions, 2001 (1 page).*
Definition of "Bit array" from http://en.wikipedia.org/wiki/Bit_array, retrieved from the Internet on Aug. 26, 2006.*

* cited by examiner

Primary Examiner—Susanna M. Diaz
(74) Attorney, Agent, or Firm—Blakely, Sokoloff, Taylor & Zafman, LLP; Judith A. Szepesi

(57) ABSTRACT

An order scheduling system providing a method for distributing product orders to multiple fulfillers is described. This method, which solves the common business problem of scheduling order shipments, is optimal because it minimizes the number of orders across fulfillers, thus minimizing shipping costs. It is also fair because orders are distributed equally across fulfillers if that fulfiller has the product available. To schedule orders, a data structure is defined whose rows are represented by a hash table of Fulfillers (HF), where each column is a hash table of Products (HP) and where each index of HP is itself a bit vector ($VP_i$). This gives a three-dimensional data structure. The method operates by performing bitwise ANDing (&) operations of the bit vectors, to generate an Order bit vector representing the optimized fulfillment (per system configuration/constraints) for a particular received order.

16 Claims, 14 Drawing Sheets

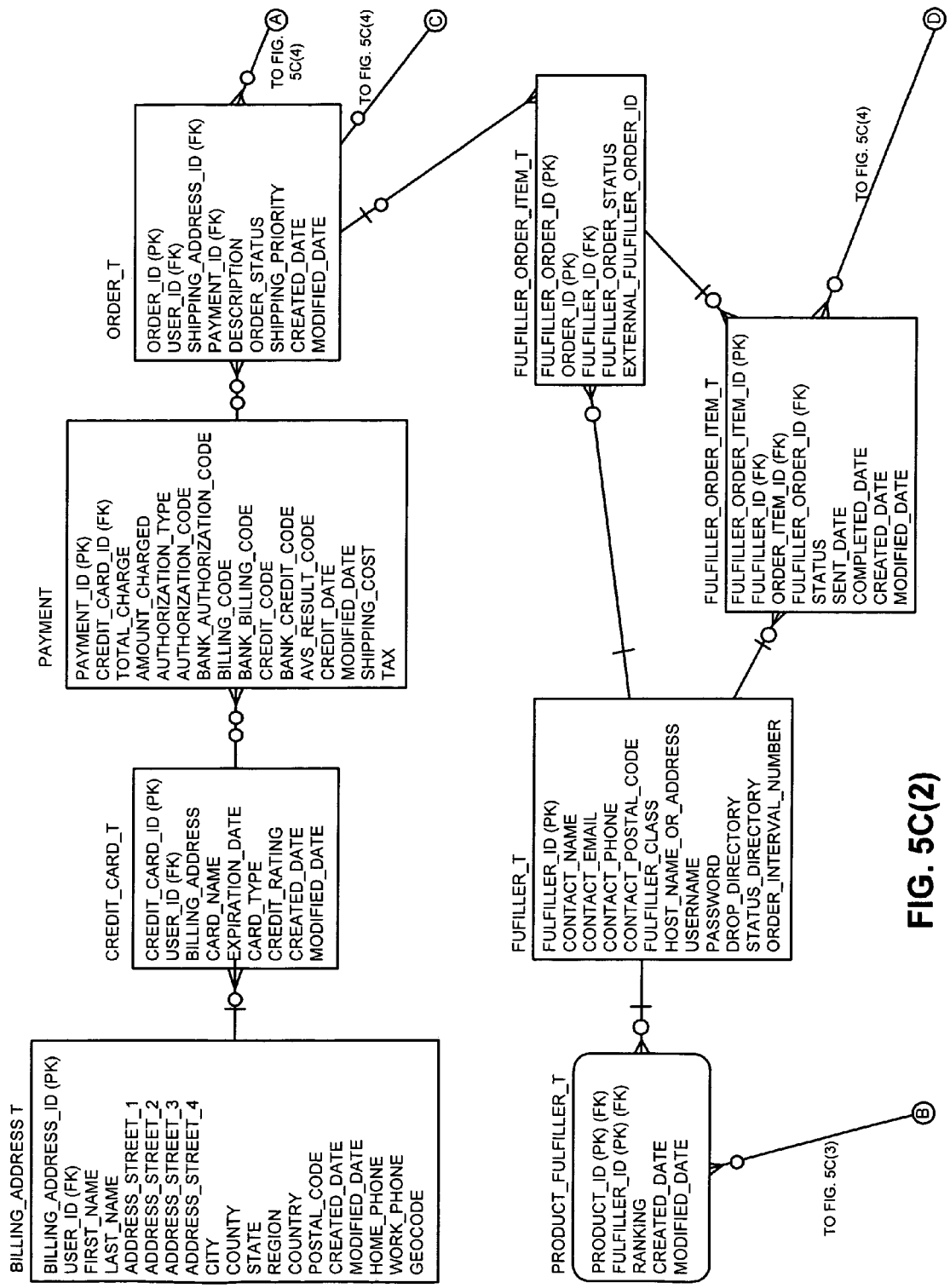
FIG. 5C(2)

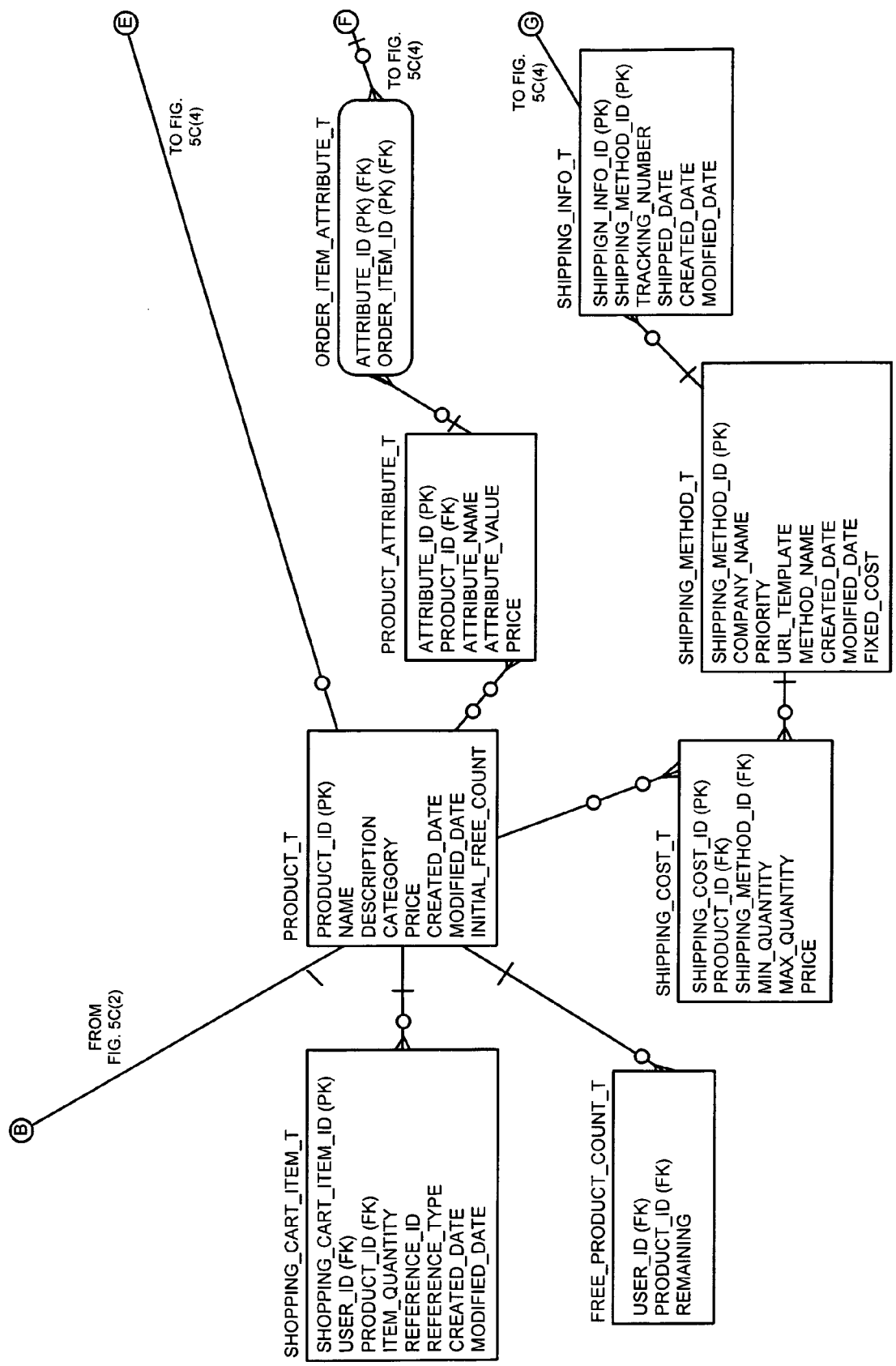
FIG. 5C(3)

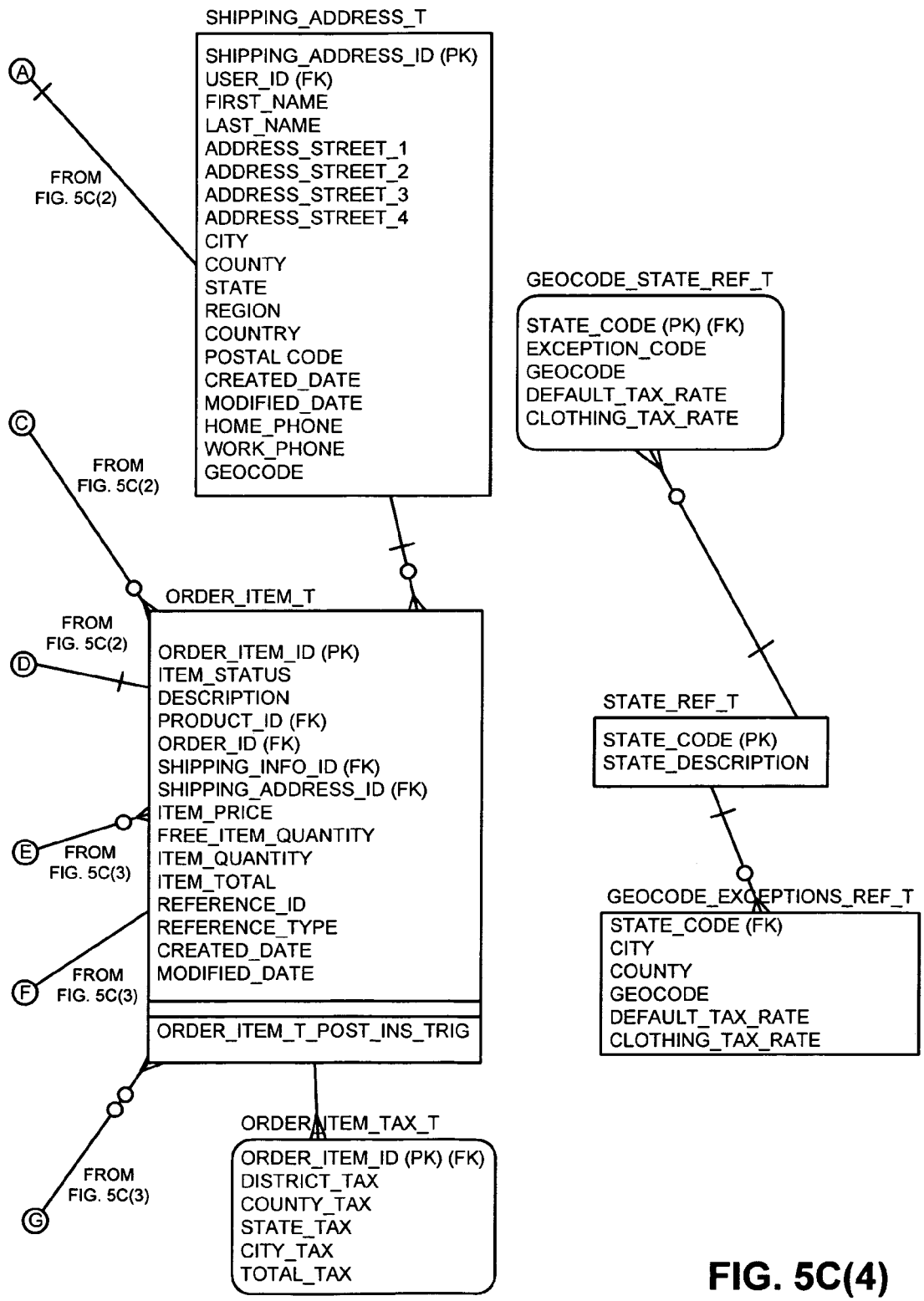
FIG. 5C(4)

ORDER SCHEDULING SYSTEM AND METHODOLOGY

A computer program listing appendix has been included on a single compact disc, with a file named LS0026-comptuer-program-listing-appendix.doc with a size of 76 KB and a creation date of Jul. 18, 2005. The file and its content have been incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the field of order fulfillment and, more particularly, to system and methodology for efficiently managing order fulfillment.

2. Description of the Background Art

Despite advances afforded by e-commerce, a fundamental problem still exists today in terms of how to efficiently fulfill an order that has been placed by a customer. This problem typically faces those who take customer orders, that is, the "middlemen" (which is used herein to broadly refer to retailers, distributors, or the like). Often, a middleman will have to send a customer order to a "fulfiller," that is, an organization that will fulfill the order by actually shipping ordered goods back to the customer. The considerations involved in choosing a particular fulfiller are numerous, but typically a middleman chooses a fulfiller with the primary goal of minimizing costs, thus maximizing profits. Different cost-related constraints may come into play, when striving to maximize profit. For example, in addition to the cost incurred as a result of the price charged by a given fulfiller, other cost considerations include what shipping charges are incurred when shipping from a given fulfiller. One fulfiller may have a better price, but that price advantage may be negated by unfavorable shipping charges. Further, cost is not the only factor to consider. Instead, at least some consideration must be given to the ability of a particular fulfiller to timely fulfill an order. There is no point in choosing a fulfiller who offers the best price, if that fulfiller lacks sufficient inventory to successfully fulfill the order in a reasonable period of time.

Often an order cannot be completely fulfilled, or supplied, by a single fulfiller; therefore, the fulfillment of such an order is spread across multiple fulfillers. The determination of the distribution of sub-orders, or product orders within an order, to multiple fulfillers is the scheduling of order shipments for that order. Order shipment scheduling attempts to optimize the fulfiller distribution to minimize the shipping costs to either the customer or to the middleman processing the order. Minimizing the shipping costs almost invariably indicates minimizing the number of fulfillers satisfying an order. Optimized scheduling also minimizes delivery time, and satisfies any arbitrary business logic, such as favoring specified fulfillers (when more than one fulfiller can deliver the same order item in an order). The middleman needs to efficiently optimize the order shipment(s) scheduling according to whatever constraints he or she uses as criteria for assigning order items to fulfillers.

Previous attempts to automate (by computer programming) the optimization of order shipment scheduling have not been satisfactory. Current methods involve considerable time for programming development/updating, and require costly compute time. The prevailing approach uses the simplex method for solving the linear programs comprising multiple simultaneous linear equations; see, e.g., Anderson, David Ray, *An Introduction to Management Science: Quantitative Approaches to Decision Making*, Seventh Edition, Chapter 5 (particularly at pp. 190-192), West Publishing Company, 1994, the disclosure of which is hereby incorporated by reference. This approach develops a linear programming model comprising a set of linear equations: each linear equation describes a constraint (e.g., proximity of shipper-to-shipping recipient) to be applied to all potential fulfillers.

A linear equation solves for a single variable, and takes the form: $ax+b=0$, where x is the unknown variable, and both a and b are constant numerical values. In linear equations, the variable, x, always has its exponential value set to 1; exponential or logarithmic variable types are not employed as operands in linear equations. Each linear equation can be graphed as a straight line in a two-dimensional XY-coordinate plane. The coefficient for the variable (the constant numerical value of a, in the generic form) determines the slope of the straight line for that equation. This equation is processed for every fulfiller considered. If the scheduling method implements multiple constraints, then a separate linear equation is processed against each constraint simultaneously. Multiple linear equations can be mapped onto a two-dimensional graph. The set of possible solutions (that minimizes for these constraints) is bound by the area beneath the intersections of the straight line on the graph.

FIG. 1 is an XY two-dimensional coordinate graph showing the slopes for three separate linear equations representing three constraints in a problem for scheduling types of personal computers (e.g., DeskPro™): warehouse capacity, display units, and assembly time. FIG. 1 includes the slope 100 for the equation constraining warehouse capacity, the slope 110 for the equation constraining display units, the slope 120 for the equation constraining assembly time, the area-bounding intersection 130 of the X and Y axes at value (0,0), the area-bounding intersection 140 of the warehouse capacity slope 100 and the X-axis, the area-bounding intersection 150 of the assembly time slope 120 and the warehouse capacity slope 100, the area-bounding intersection 160 of the display units slope 110 and the assembly time slope 120, and the area-bounding intersection 170 of the Y-axis and the display units slope 110. The area bound by the intersections in FIG. 1, 130, 140, 150, 160, and 170, contains the set of feasible solutions for this problem. A discrete solution for any variable (constraint) can be determined by holding all the other variables' values at a constant (within the feasible set).

Current systems using linear programming with multiple simultaneous equations leave much to be desired. A well-known problem with linear solutions is that the simplex method requires intensive iteration. Computerized solutions for multiple simultaneous equations are therefore time-consuming. Another deficiency with linear programming is the programmatic difficulty in setting-up the equations. Because the constraints can be described in linear equations with inequalities, it is challenging to program a general solution that applies to every scenario. Full appreciation of all the factors defining the constraints cannot be completely known a priori. For example, if the program implements a policy towards minimizing shipping costs, the program would need to know all of the distances between the location of the middleman or the customer and the location of every fulfiller: that information would have to be put into a database, and extracted-out and placed into a coefficient for each iteration of each equation. The approach has a degree of fuzziness that stems from the implicit effects of other incidental variables, such as slack time (which is the consequence of having determined the best solution, there is always a remainder left over).

The simplex method of solving linear equations is not the only method; however, the other methods are even more difficult to implement. Because of the ever-increasing demands of the marketplace (and e-commerce marketplace) for timely, cost-effective fulfillment of customer orders, much interest exists in finding a solution to these problems.

GLOSSARY bit vector: A one-dimensional array of bit (e.g., 1 and 0) values, which is useful for specifying a sequence of Boolean (true/false) values.

fulfiller: Fulfiller, as used herein, broadly refers to any entity capable of fulfilling an order or portions (i.e., order items) thereof, which may include a distributor, supplier, vendor, manufacturer, service bureau, or the like. Typically, the fulfiller receives orders from a middleman (e.g., retailer, or the like). The fulfiller may fulfill an order by shipping directly to the end customer, or by shipping to the middleman (who in turn ships to the end customer).

HTTP: Short for HyperText Transfer Protocol, the underlying protocol used by the World Wide Web. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in REC 2616: Hypertext Transfer Protocol—HTTP/1.1, the disclosure of which is hereby incorporated by reference. RFC 2616 is available from the World Wide Web Consortium (W3).

Java: A general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java Virtual Machines (JVMs), exist for most operating systems, including UNIX, the Macintosh OS, and Windows. Bytecode can also be converted directly into machine language instructions by a just-in-time compiler (JIT).

Servlet: An applet that runs on a server. The term usually refers to a Java applet that runs within a Web server environment. This is analogous to a Java applet that runs within a Web browser environment. Java servlets are becoming increasingly popular as an alternative to CGI programs. The biggest difference between the two is that a Java applet is persistent. Once it is started, a servlet stays in memory and can fulfill multiple requests. In contrast, a CGI program disappears once it has fulfilled a request. The persistence of Java applets tends to make them faster.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium the disclosure of which is hereby incorporated by reference.

SUMMARY OF THE INVENTION

An order scheduling system providing a method for distributing product orders to multiple fulfillers is described. This method solves the common business problem of scheduling order shipments. The method is both optimal and fair (among multiple otherwise-equal fulfillers). It is optimal because it minimizes the number of orders across fulfillers, thus minimizing shipping costs. It is fair because orders are distributed equally across fulfillers if that fulfiller has the product available.

To schedule orders, a data structure is defined whose rows are represented by a hash table of Fulfillers (HF), where each column is a hash table of Products (HP) and where each index of HP is itself a bit vector ($VP_i$). This gives a three-dimensional data structure. Here, the term "hash" is used to indicate that for a given fulfiller/product pair, the approach may "hash" (i.e., index on) that pair for indexing into a particular cell in the table. This fulfiller/product correspondence may also be represented by a two-dimensional array (e.g., accessible via numeric indexes). Although the information represented in the hash table may be derived from SQL queries submitted to a product/supplier database, it is more efficient to maintain this information in a relatively terse in-memory data structure, as the information will be repeatedly accessed.

In contrast to using linear equations for representing this information, the hash table itself is extensible. If additional fulfillers or suppliers become available, the number of rows in the hash table is simply increased (or simply decreased to represent less). In a corresponding manner, the number of rows in the hash table may be increased or decreased to accommodate changes in the current product offerings. Thus, when changes occur, as they invariably will, the hash table may readily accommodate those changes. There is no requirement that the underlying program code be modified.

Whether a particular fulfiller has a product available does not necessarily depend on that fulfiller's inventory. Certainly, limited inventory poses a problem to product availability by a fulfiller. However, some products have effectively unlimited inventory. For example, the ability of a photofinisher to provide an almost unlimited number of reprints for a customer photograph is one such example. Here, the photofinisher (fulfiller) has effectively unlimited supply of photo-finishing paper available for completing the customer order (of reprinting a photograph). Therefore, often the issue of whether a particular product is available from a given fulfiller depends on whether that fulfiller actually even offers that product to begin with.

An order itself may be viewed as one or more order items (typically, corresponding to a particular product). In certain cases, it may be necessary to split a customer order among the multiple fulfillers, based on order items. For example, an order may be split into two order items, $OI_1$ and $OI_2$, in effect, two suborders. The order may be split by having one fulfiller, $F_1$, fulfill $OI_1$, while a second fulfiller, $F_2$, fulfills $OI_2$. A $VP_i$ vector, which extends into the third dimension (z axis) of the above hash table, is potentially employed in such instances. The $VP_i$ vector allows tracking of what part of an order—specifically, what order item—was split and to which fulfiller.

Using the above-described bit vectors, the method may perform bitwise ANDing (&) operations of the bit vectors. This generates an Order bit vector representing the optimized fulfillment (per system configuration/constraints) for a particular received order.

BRIEF DESCRIPTION OF THE DRAWINGS

FIG. 5C(1) is a block diagram illustrating the arrangement of detailed views for a database schema employed by the order scheduling system.

DETAILED DESCRIPTION OF A PREFERRED EMBODIMENT

The following description will focus on the presently-preferred embodiment of the present invention, which is implemented in an Internet-connected server environment running under a server operating system, such as the Microsoft® Windows XP running on an IBM-compatible PC. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
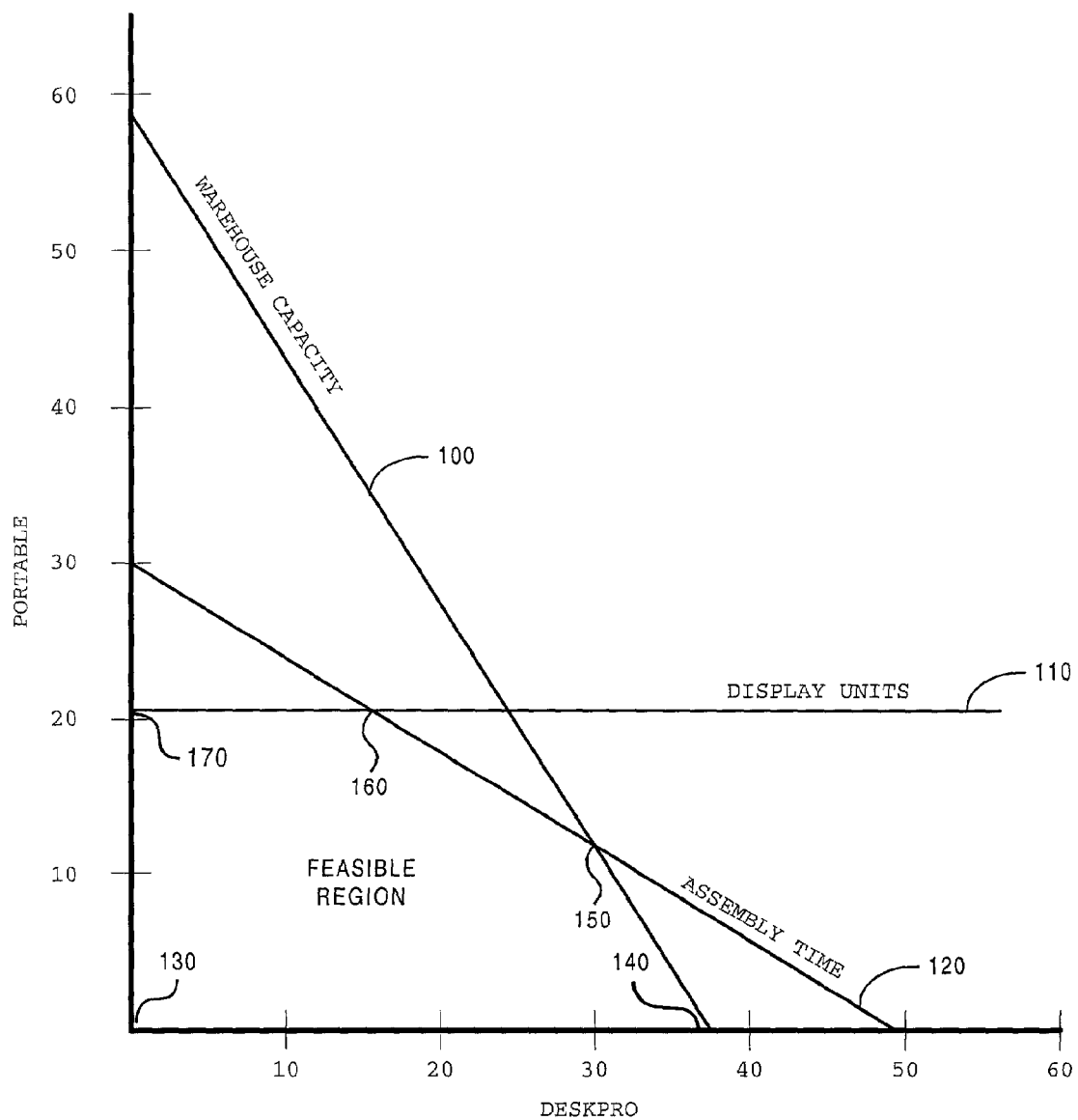
FIG. 1 is a graph illustrating the simplex method for scheduling order fulfillment.
Figure 2:
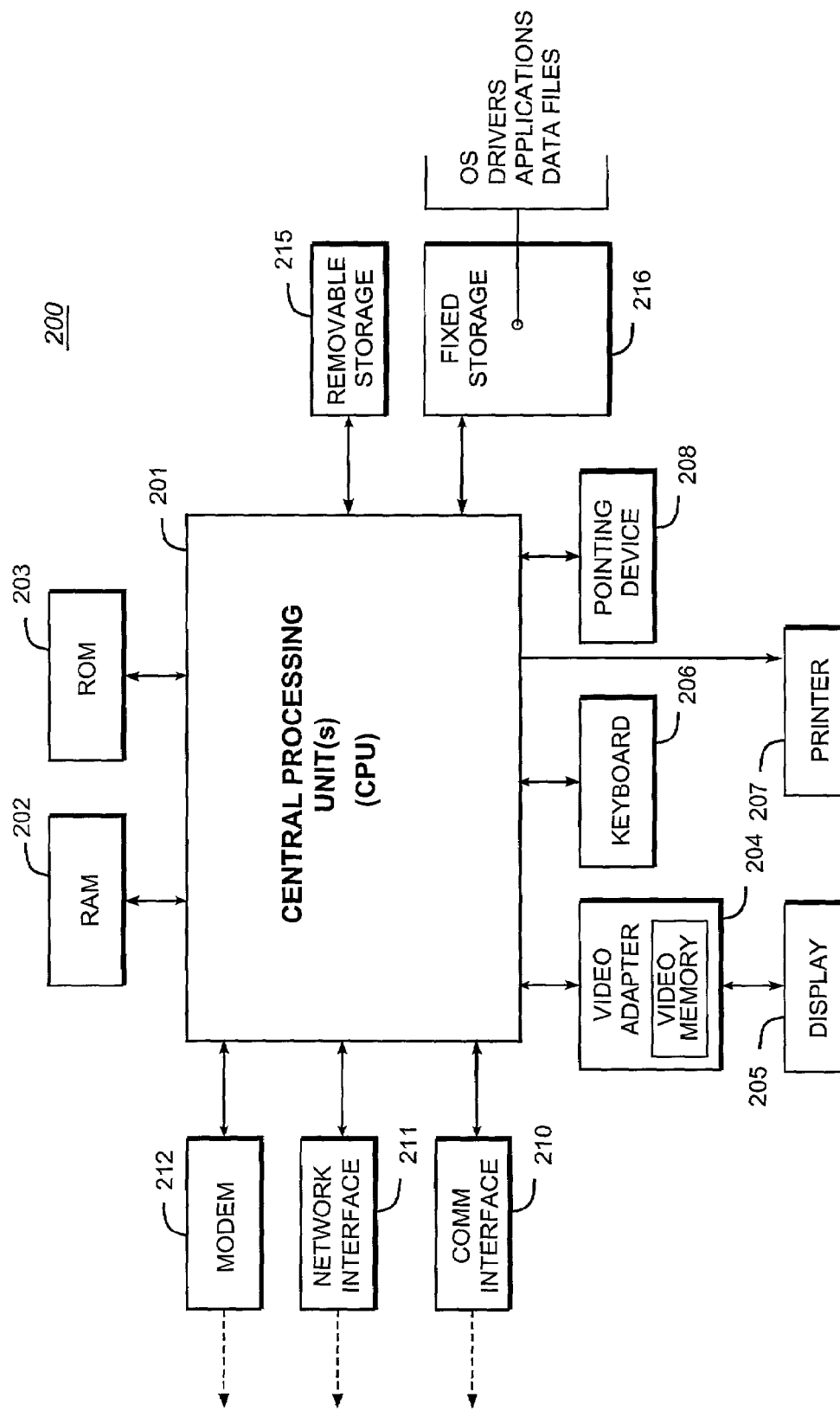
FIG. 2 is a block diagram of a computer system in which software-implemented processes of the present invention may be embodied.

The present invention may be implemented on a conventional or general-purpose computer system, such as an IBM-compatible personal computer (PC) or server computer. FIG. 2 is a very general block diagram of an IBM-compatible system 200. As shown, system 200 comprises a central processing unit(s) (CPU) or processor (s) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk, CD-ROM, CD-R, CD-RW, or the like), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or mass storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the display screen 205. Likewise, the pointing device 208, such as a mouse, track ball, pen device, or the like, permits selection and manipulation of objects on the display screen. In this manner, these input devices support manual user input for any process running on the system.

The computer system 200 displays text and/or graphic images and other data on the display device 205. The video adapter 204, which is interposed between the display 205 and the system, drives the display device 205. The video adapter 204, which includes video memory accessible to the CPU 201, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include a RS-232 serial port, a Universal Serial Bus (USB) interface, or the like. Devices that will be commonly connected locally to the interface 210 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 3:
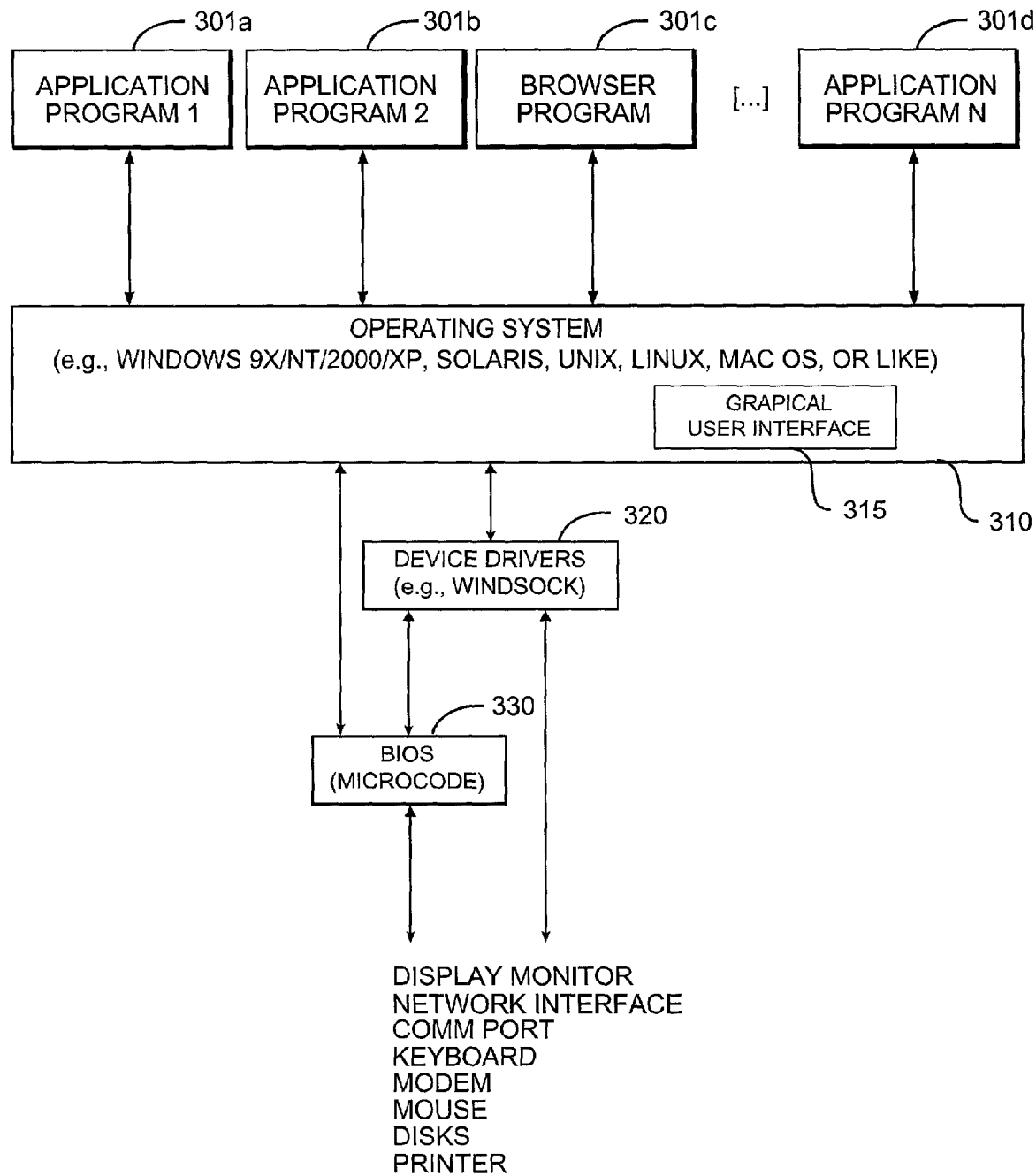
FIG. 3 is a block diagram of a software system for controlling the operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c, 301d) may be "loaded" (i.e., transferred from fixed storage 216 into memory 202) for execution by the system 200.

System 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver—Windows' implementation of a TCP/IP stack) and the system BIOS microcode 330 (i.e., ROM-based microcode), particularly when interfacing with peripheral devices. OS 310 can be provided by a conventional operating system, such as Microsoft® Windows 9x, Microsoft® Windows NT, Microsoft® Windows 3000, or Microsoft Windows XP, all available from Microsoft Corporation of Redmond, Wash. Alternatively, OS 310 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists at least one host computer (e.g., "server") that may communicate with one or more other computers (e.g., "clients"). The present invention, however, is not limited to any particular environment or device configuration. Instead, the present invention may be implemented in any type of system architecture or processing environment capable of supporting the methodologies of the present invention presented in detail below.

II. Order Scheduler

A. Introduction

Existing order fulfillment systems typically include a database of products (that are being sold to customers), with the database tracking which product can be fulfilled or supplied by which fulfiller(s). Thus, an existing one-to-many relationship of product to fulfiller/supplier is often already tracked in conventional fulfillment systems. For a given row (record) of product represented in the database, a given supplier either has or does not have that product; this may be represented as a simple Boolean (true/false) value. In the aggregate (i.e., for multiple fulfillers), availability by fulfiller may be represented by a bit vector (i.e., a one-dimensional array of bit values), where a bit value of 1 represents true (i.e., the fulfiller has the product) and a bit value of 0 represents false (i.e., the fulfiller does not have the product). By using bit vectors to represent this information (which itself may be extracted from a product/fulfiller database), the task of programming an appropriate solution is simplified.

B. Overview

The following description presents a method for distributing product orders to multiple fulfillers. This method solves the common business problem of scheduling order shipments. The method is both optimal and fair (among multiple otherwise-equal fulfillers). It is optimal because it minimizes the number of orders across fulfillers, thus minimizing shipping costs. It is fair because orders are distributed equally across fulfillers if that fulfiller has the product available.

Figure 4A:
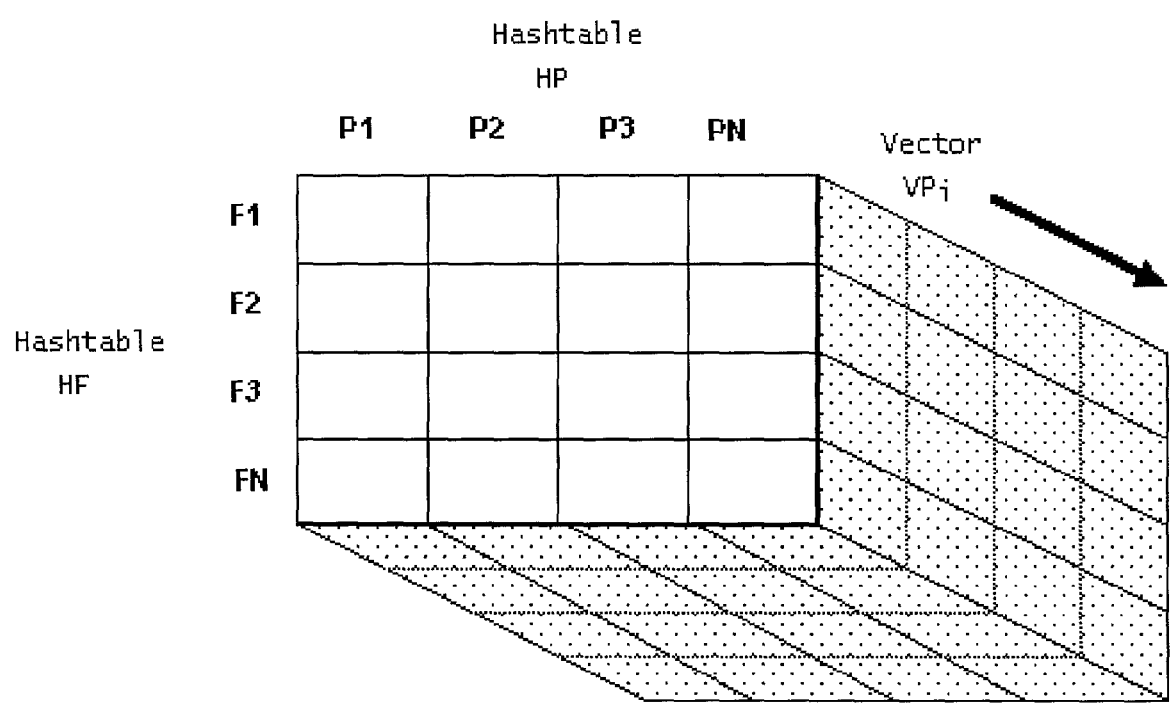
FIG. 4A is a diagram illustrating a hash table data structure employed in the system of the present invention.

To schedule orders, a data structure is defined whose rows are represented by a hash table of Fulfillers (HF), where each column is a hash table of Products (HP) and where each index of HP is itself a vector ($VP_i$). This gives the three-dimensional data structure shown in FIG. 4A. Here, the term "hash" is used to indicate that for a given fulfiller/product pair, the approach may "hash" (i.e., index on) that pair for indexing into a particular cell in the table. This fulfiller/product correspondence may also be represented by a two-dimensional array (e.g., accessible via numeric indexes). Although the information represented in the hash table may be derived from SQL queries submitted to a product/supplier database, it is more efficient to maintain this information in a relatively terse in-memory data structure, as the information will be repeatedly accessed.

In contrast to using linear equations for representing this information, the hash table itself is extensible. If additional fulfillers or suppliers become available, the number of rows in the hash table is simply increased (or simply decreased to represent less). In a corresponding manner, the number of rows in the hash table may be increased or decreased to accommodate changes in the current product offerings. Thus, when changes occur, as they invariably will, the hash table may readily accommodate those changes. There is no requirement that the underlying program code be modified.

Whether a particular fulfiller has a product available does not necessarily depend on that fulfiller's inventory. Certainly, limited inventory poses a problem to product availability by a fulfiller. However, some products have effectively unlimited inventory. For example, the ability of a photofinisher to provide an almost unlimited number of reprints for a customer photograph is one such example. Here, the photofinisher (fulfiller) has effectively unlimited supply of photo-finishing paper available for completing the customer order (of reprinting a photograph). Therefore, often the issue of whether a particular product is available from a given fulfiller depends on whether that fulfiller actually even offers that product to begin with.

Figure 4B:
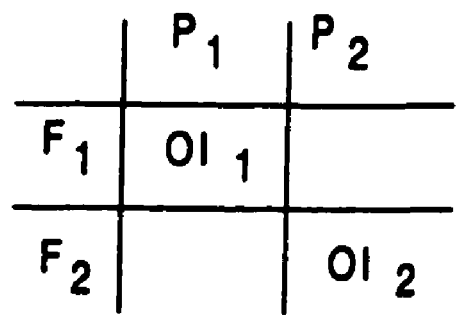
FIG. 4B is a diagram illustrating simple order splitting.
Figure 4C:
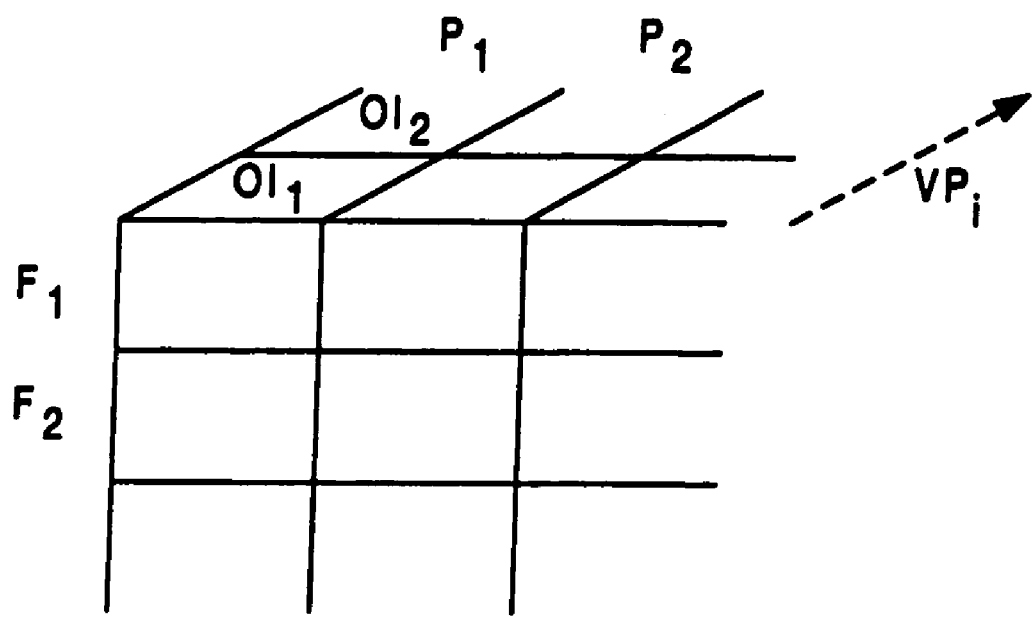
FIG. 4C is a diagram illustrating more-complex order splitting.

An order itself may be viewed as one or more order items (typically, corresponding to a particular product). In certain cases, it may be necessary to split a customer order among the multiple fulfillers, based on order items. FIG. 4B illustrates this concept. There, the order has been split into two order items, $OI_1$ and $OI_2$, in effect, two suborders. As shown, order has been split by having one fulfiller, $F_1$, fulfill $OI_1$, while a second fulfills $OI_2$. The $VP_i$ vector, which extends into the third dimension (z axis), is potentially employed in such instances. The $VP_i$ vector allows tracking of what part of an order—specifically, what order item—was split and to which fulfiller it was split to. FIG. 4C illustrates this concept. Suppose an order consists of three order items: a 5×7 reprint of a dog photograph (product type of $P_1$), a 5×7 reprint of a cat photograph (also product type of $P_1$), and a coffee mug embossed with a bird photograph (product type of $P_2$). To track that fulfiller $F_1$ is to fulfill the order items of type $P_1$, $OI_1$ and $OI_2$ are entered in the $VP_i$ vector that is indexed by $F_1$ and $P_1$. Similary, that fulfiller $F_2$ is to fulfill the order items of type $P_2$ $OI_3$ is entered in the $VP_i$ vector that is indexed by $F_2$ and $P_2$.

C. Example: Setting up Bit Vectors

To understand how the order scheduler methodology works, consider the following example, which illustrates use of bit vectors. An order may contain any or all of the following products.

$P_1$ 4×6 photographic print
$P_2$ 8×10 photographic print
$P_3$ coffee mug embossed with photo The fulfillment system will have one or more fulfillers that can be chosen to fill the order. However, not every fulfiller may have all products.

$F_1$ 4×6 print, coffee mug (2 products)
$F_2$ coffee mug (1 product)
$F_3$ 4×6 print, 8×10 print, coffee mug (3 products)

The function F1.count( ) returns 2.

In order to represent the products a fulfiller can supply, a bit vector is used, as follows:

$F_1$.bv[101] (which is $P_1$ and $P_3$)
$F_2$.bv[001] (which is $P_3$)
$F_3$.bv[111] (which is $P_1$, $P_2$ and $P_3$)

An Order is a sequence of OrderItems where each OrderItem is one product. An Order could appear as:

Order
 OrderItem 4×6 print
 OrderItem coffee mug

The above order would have the following bit vector Order.bv [101]. Initially, the method may save the enumeration of the fulfiller hash table in another vector called AllF[$F_1$ $F_2$ $F_3$]. The sequence of the fulfillers in this vector is subject to change. All of the fulfillers may be saved in another vector and ordered by the number of products they fulfill; this is called vector AllFByCount [$F_3$ $F_1$ $F_2$]. $F_3$ has the most products so it appears first in the vector. The sequence of this vector is fixed and will not change. As described in further detail below, the basic approach adopted includes performing bitwise ANDing operations of the bit vectors, to generate an Order bit vector representing the optimized fulfillment (per system configuration/constraints) for a particular received order.

D. Order Scheduler Components

Figure 5A:
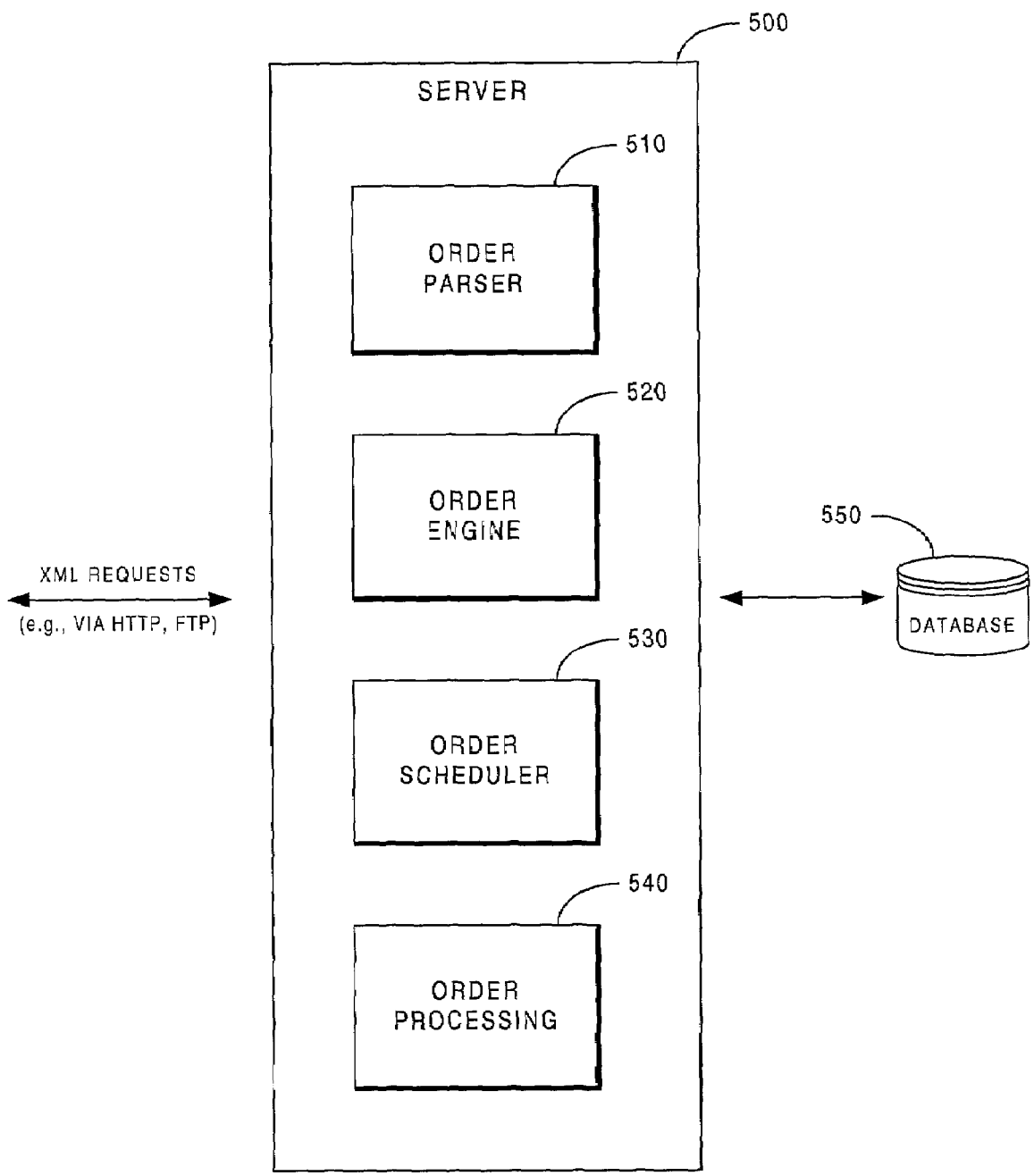
FIG. 5A is a high-level block diagram illustrating a server-based order scheduling system of the present invention.

As shown in FIG. 5A, a server-based order scheduler system 500 constructed in accordance with the present invention includes an order parser 510, an order engine 520, an order scheduler 530, an order processing module 540, and a back-end (SQL) database 550. The order parser 510 receives XML requests (e.g., via HTTP, FTP, or the like) that comprise order information for orders that are to be fulfilled. The parsed information, in turn, is stored in the database 550 as an order (comprising one or more order items) in ORDER_T and ORDER_ITEM_T tables. The order engine 520 may now invoke various components for handling the database-logged order. In particular, the engine 520 invokes the order scheduler 530, described in further detail below, for optimizing fulfillment of each received order. Once the desired optimized fulfillment of a particular order has been determined, the order processing module 540 is invoked for actual processing of the order, such as submitting online fulfillment requests (i.e., order to particular fulfillers) and/or generating hardcopy documents, as desired.

Figure 5B:
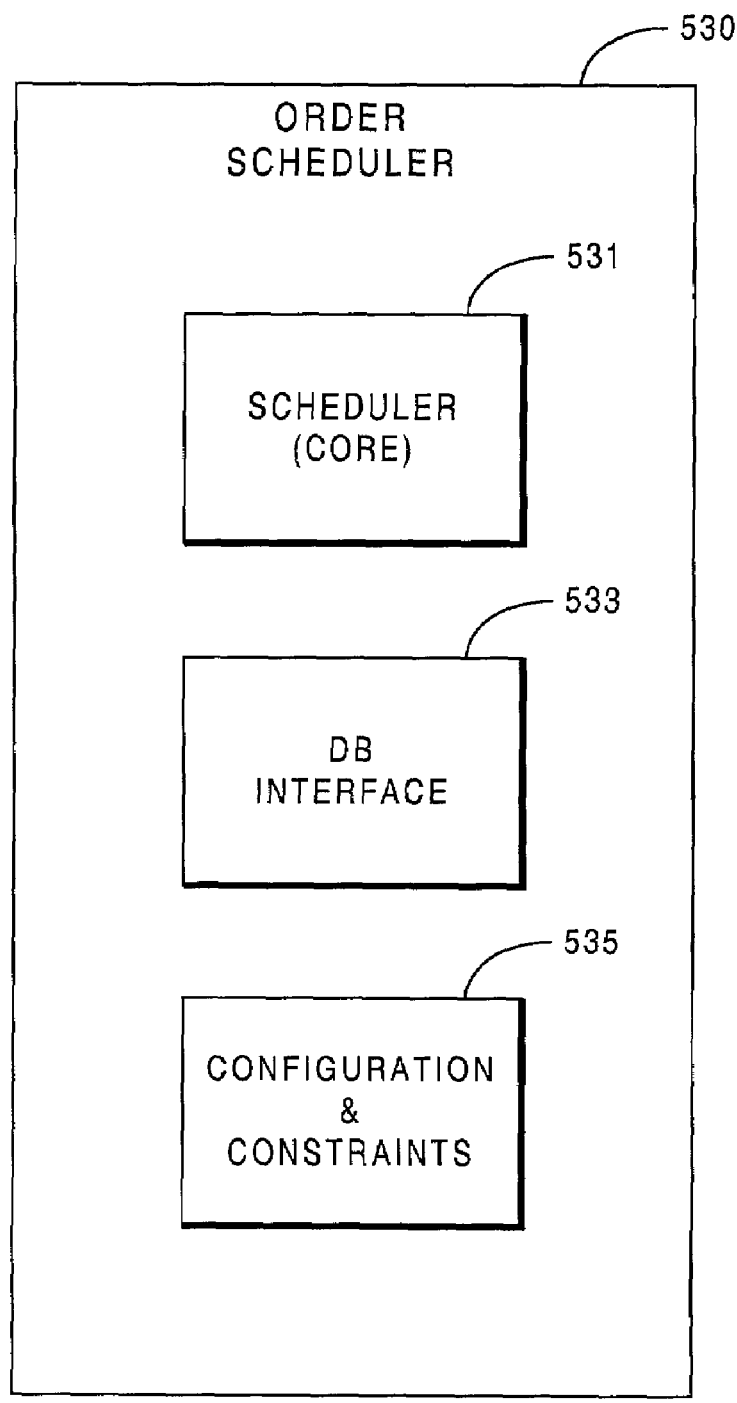
FIG. 5B is a block diagram illustrating an order scheduler module of the order scheduling system.

Of particular interest is the order scheduler 530, which is illustrated in greater detail in FIG. 5B. As shown, the order scheduler 530 includes a scheduler core or engine 531, a database interface 533, and a configuration/constraints module 535. These modules are implemented as server-side Java components (servlets). The scheduler core 531 implements the core logic for optimizing fulfillment of orders; its detailed operation is discussed below. The database interface 533 provides databases connectivity (including SQL query ability) to the back-end database. The configuration/constraints module 535 allows specification of various policies, including configuration settings and fulfillment constraints. For example, the module 535 may be employed to specify a fulfillment constraint that a particular fulfiller/supplier is most favored. Additionally, the module 535 allows specification that orders are to be fulfilled by proximity (of fulfiller to customer), by count (of order items per fulfiller), or the like.

Figure 5C:
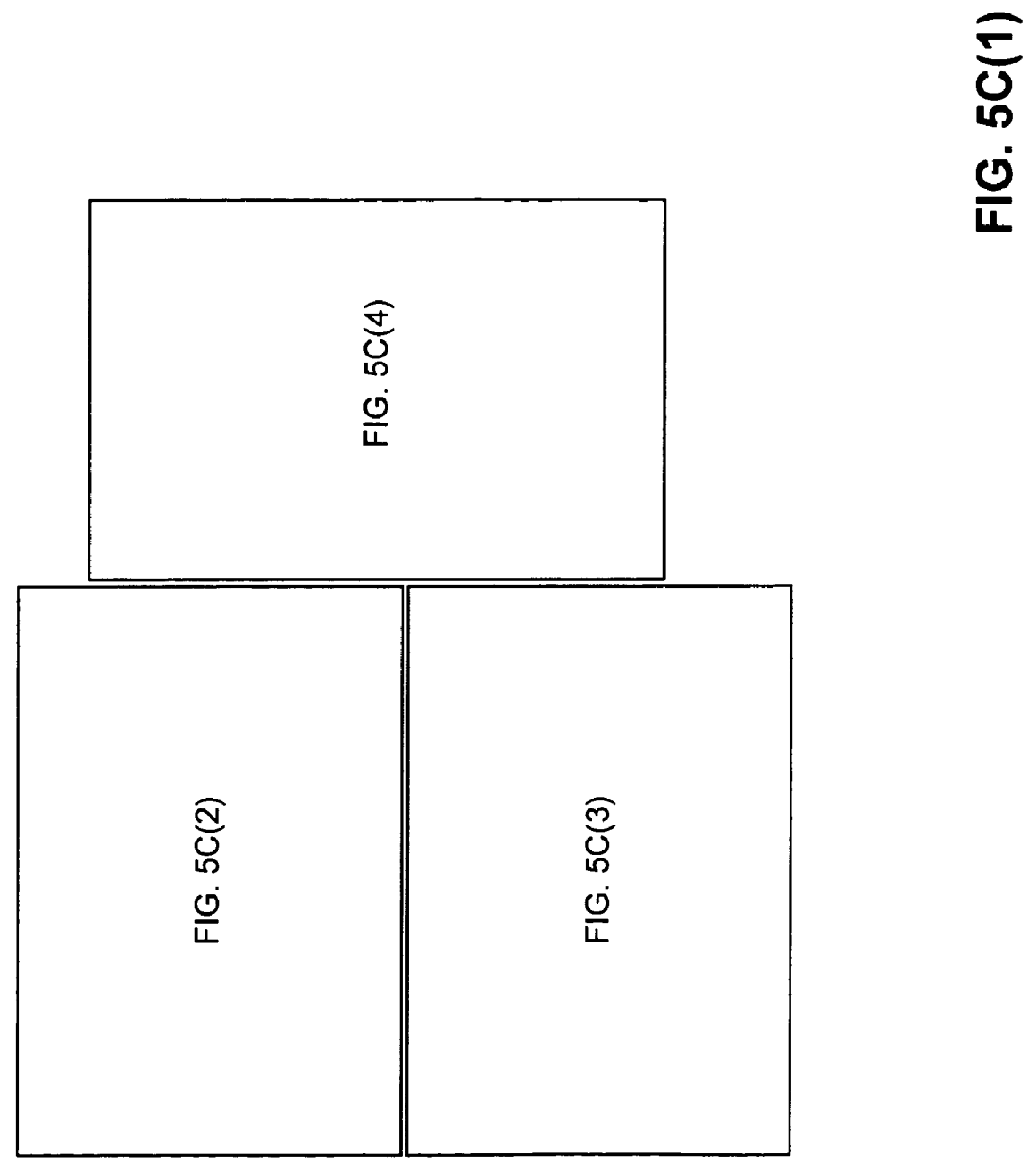

FIGS. 5C(2)-5C(4) illustrates construction of the database in further detail. The database itself may be implemented as an SQL-based relational database, such as an Oracle database (e.g., in Oracle 8i, available from Oracle Corporation of Redwood Shores, Calif.). In particular, the figures demonstrate a detailed views of a database schema employed for the database in the currently-preferred embodiment. FIG. 5C(1) provides an overview of the arrangement of the detailed views illustrated in FIGS. 5C(2)-5C(4). The following database tables are of particular interest in the database schema:

ORDER_T—describes an order, has a set of order items;
ORDER_ITEM_T—describes what the product and order item specialty is that a user ordered;
FULFILLER_ORDER_T—allows splitting an order into multiple fulfiller orders (sub-orders);
FULFILLER_ORDER_ITEM_T—similar to ORDER_ITEM_T but represents the order items in a sub-order;
PRODUCT_T—describes a product, e.g., a 4×6 photo print, or the like; and PRODUCT_FULFILLER_T—associates which products are available for which fulfillers.

E. Detailed Operations

1. High-Level Method of Operation

Figure 6:
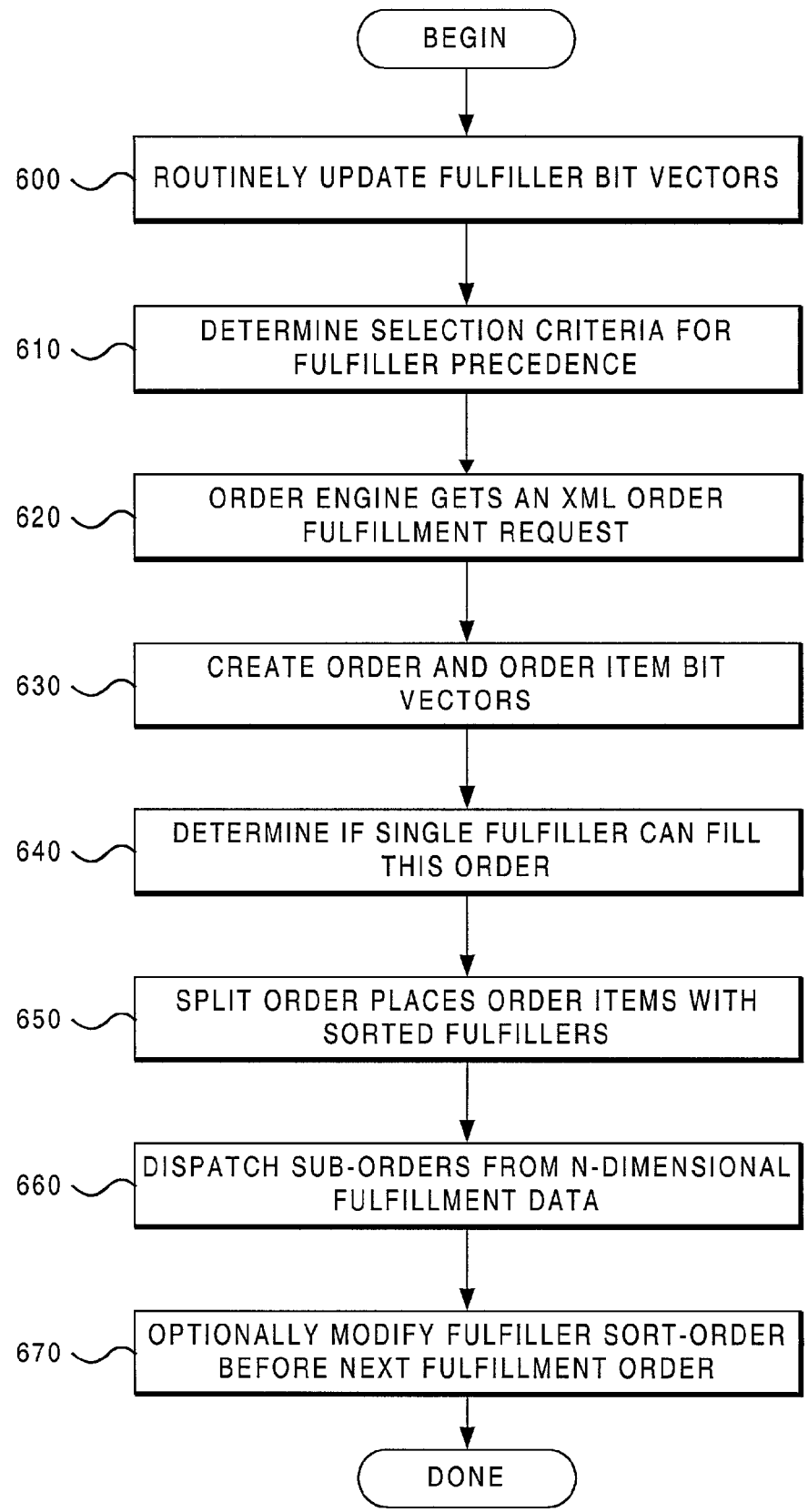
FIG. 6 is a flowchart illustrating overall operation of the order scheduling system of the present invention.

FIG. 6 is a flowchart summarizing overall operation of the system. As shown at step 600, the bit vectors mapping product availability for each fulfiller are routinely updated from the database. This updating includes adding/deleting fulfillers to a vector of fulfillers. The updating may include refreshing each bit according to periodic updates in inventory tables, in cases of extended implementations of the preferred embodiment that incorporate inventory data. During the update, each fulfiller is allotted a bit vector with a matching number of elements as the product hash table has cells corresponding to all the products ($P_1$, $P_2$, . . . $P_N$) provided by the middleman. A new vector is built for each fulfiller, wherein each element, or bit, in the vector (which corresponds to each product type of the middleman, in the product hash table) is set to 1 (for true) if the fulfiller provides that product. Otherwise, that bit is set to 0 (for false) if the fulfiller does not provide this type of product. Therefore, if the middleman offers three types of products, and a particular fulfiller provides the second and third products (as represented by the product hash table) the fulfiller's bit vector would be set to "011".

At step 610, the middleman sets the scheduling policy for determining the selection criteria for the fulfiller precedence, or sort-ordering in a vector of all the fullfillers' bit vectors. In the most general case, the selection criteria, or constraint, is to minimize the number of fulfillers splitting the fulfillment of each individual middleman order. The sort-ordering of a vector of all fulfillers reflects the selection criteria by advancing the fulfiller whose most satisfies that criteria to the front of a runtime vector of fulfillers' bit vectors, AllF[ ]. bv. When a fulfillment order is scheduled, the fulfiller vector is processed sequentially from element 0 to element N-1. Fulfillers at the front of the fulfiller vector have an earlier opportunity to fulfill each order item in a fulfillment order.

At step 620, the order engine (described above as 520) fetches a fulfillment order request. The order parser had already populated the database with the order data when the XML-encoded order request was received by either an HTTP or an FTP communication with the order-generating client (e.g., order entry at a PC). At step 630, the order items requested in the fulfillment order are mapped to the product items in the middleman's product line, the product hash table. Using the same bit vector mapping for the order's bit vector as was used at step 610 (in creating each fulfiller's bit vector: order items whose product type matched one of the middleman's product types), at step 630, an order bit vector is populated for the current order. Using the same logic as was used at step 610, at step 630, a new order vector is built for the current order, wherein each element, or bit, in the vector (which corresponds to each product type of the middleman, in the product hash table) is set to 1, for true, if the order requests that product. Otherwise, that bit is set to 0, for false if the order does not request this type of product. Therefore, if the middleman offers three types of products, and a particular order requests the first and second products (as sequenced in the product hash table) the fulfiller's bit vector would be set to "110".

At step 640, the order scheduler 530 walks through the fulfiller vector, executing a bitwise & ("AND") operation on the current fulfiller bit vector and the order bit vector. If the bitwise & operation on these two bit vectors results in a bit vector with the same bit sequence as the order bit vector, then step 640 successfully fulfills the entire order with a single fulfiller (the most optimal condition), exits, and jumps ahead to step 670. If a single fuller cannot fulfill an entire order, then the order fulfillment must be split across multiple fulfillers; the method proceeds to the next step. At step 650, the order scheduler 530 walks through the sort-ordered fulfiller vector, traverses each fulfiller's product vector, and executes a bitwise & ("AND") operation on the current fulfiller bit vector and an order item bit vector for each order item in the order bit vector. While the order bit vector is a "bitwise OR" the order items, the order item bit vector has only 1 bit set. For example, if the order bit vector is represented by "101", the order item bit vector for the third product would be "001". The order item bit vector is a temporary structure used to determine where the order items should be placed in the three-dimensional data structure shown in FIG. 4A. In this step the order scheduler 530 places order items with multiple fulfillers, rather than placing the whole order with a single fulfiller. The following Java snippet tests an order item with the types of products offered by the earliest selected fulfiller:

(AllFSortedForAscendingProver[0].bv & OrderItem.bv)== OrderItem.bv

If the OrderItem cannot be placed in AllFSortedForAscendingProver [0] then the order scheduler 530 tries the next index, AllFSortedForAscendingProver [1] and so on until this order item is placed with a fulfiller. This iteration is run against every order item sequentially in a single pass through a sort-ordered list of fulfiller.

The preferred embodiment depends upon a statistically likely optimization of a minimum set of fulfillers for an order; therefore, computation time is minimal. The base program module is implemented for the present invention, thereby freeing programmatic resources for the middleman, and it need not be modified. However, it does serve as an implementation design that application developers can use to further refine their scheduling algorithms. At step 650, ancillary constraints may be accounted for by re-sort-ordering the fulfillers' vector (i.e., a fulfiller preference vector). For example, to implement another selection criteria, such as "favored fulfiller", the index position(s) for the favored fulfiller(s) can be re-indexed to the beginning of the fulfillers' vector.

At step 660, as the order items among the split order are being placed with providing fulfillers, the order scheduler 530 populates a subsequent dimension ($VP_i$, described above) for the two-dimensional matrix mapping fulfiller products with the middleman's product line. This third, or higher, dimension represents collections (vectors) of order requests for the same type of product offering, but with subtler typing information in the description of an order item. For example, using an e-commercial photographic printing service as a fictitious fulfiller or middleman, three types of products are offered: 4×6 prints, 8×10 prints, and 11×14 prints. The product type, 4×6 prints, is represented by a cell in the 2-dimensional hash tables matrix (as previously described). However, an order may list a 4×6 print as two separate order items: one 4×6 print might be of the owner's dog, whereas the subsequent 4×6 print might be of the owner's cat. In this example scenario, both 4×6 order items would be placed with the same fulfiller, who provides 4×6 prints, and each placement would be recorded in a separate element along the $VP_i$ vector indexed at the 4×6 product type for the current fulfiller.

When scheduling a split order, the creation of a new set of fulfillment orders (to be placed with multiple fulfillers)

that contains only a subset of the order items in the original customer order, is termed a sub-order. At step 660 the fulfillers vector is walked, nesting another walk along the fulfiller's product bit vector, and at each index in the 2-dimensional matrix traverse along the corresponding $VP_i$ vector, gathering order items placed along the $VP_i$ vector to be placed in each provider's sub-order.

Step 660 is the final step necessary to schedule an order fulfillment. However, before re-cycling through the sequence envisioned in FIG. 6 for fulfilling another order, the middleman may desire to re-order the sort-ordered fulfiller vector. At step 670, ancillary constraints may be accounted for by modifying the sort-ordered fulfiller vector, or fulfiller preference vector, outside of the execution loop that processes the scheduling of the fulfillment of each order. For example, if "fulfiller placement fairness" were an additional selection criteria (including the minimum number of fulfillers criteria), then subsequent to fulfilling an order, the elements in the sort-ordered fulfiller vector move one index closer to the front of the vector (e.g., AllF[0]) to enable round-robin fulfiller preference.

2. Probable Fulfillers

Figure 7:
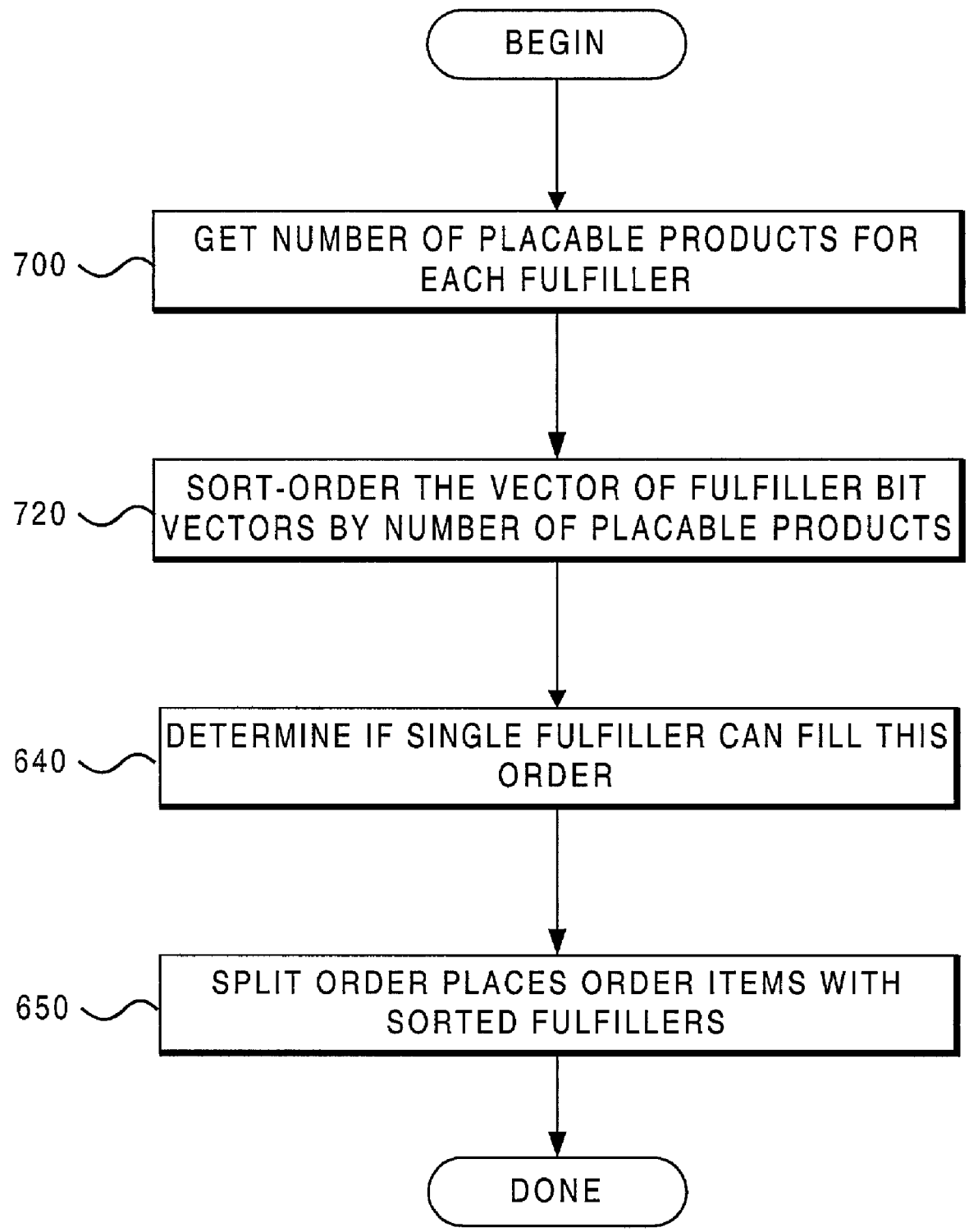
FIG. 7 is a flowchart illustrating a coarse-grained optimization method for fulfilling an order with a relatively low number of fulfillers.

FIG. 7 is a flowchart illustrating a coarse-grained optimization method for fulfilling an order with a relatively low number of fulfillers. The underlying model for this single-pass method is that sort-ordering ranking fulfillers according to the number of order items in the current order each fulfiller can place or "fulfill," results in a statistically improved likelihood of scheduling this order with a lower-than-average number of fulfillers. At step 700, each fulfiller from a fulfiller vector gets the number of order items it can place, with a method, AllF[ ].count( ). At step 720, the vector of fulfillers, AllF[ ], is sorted, in descending order, according to the number of order items that fulfiller can place. At steps 640 and 650, these steps proceed as previously described for steps 640 and 650 in FIG. 6. The method, described in FIG. 7, minimizes shipping costs by minimizing the number of disparate fulfillers, or sub-orders, each of which would likely attach a levy for basic services rendered.

3. Minimal Shipping Distance

Figure 8:
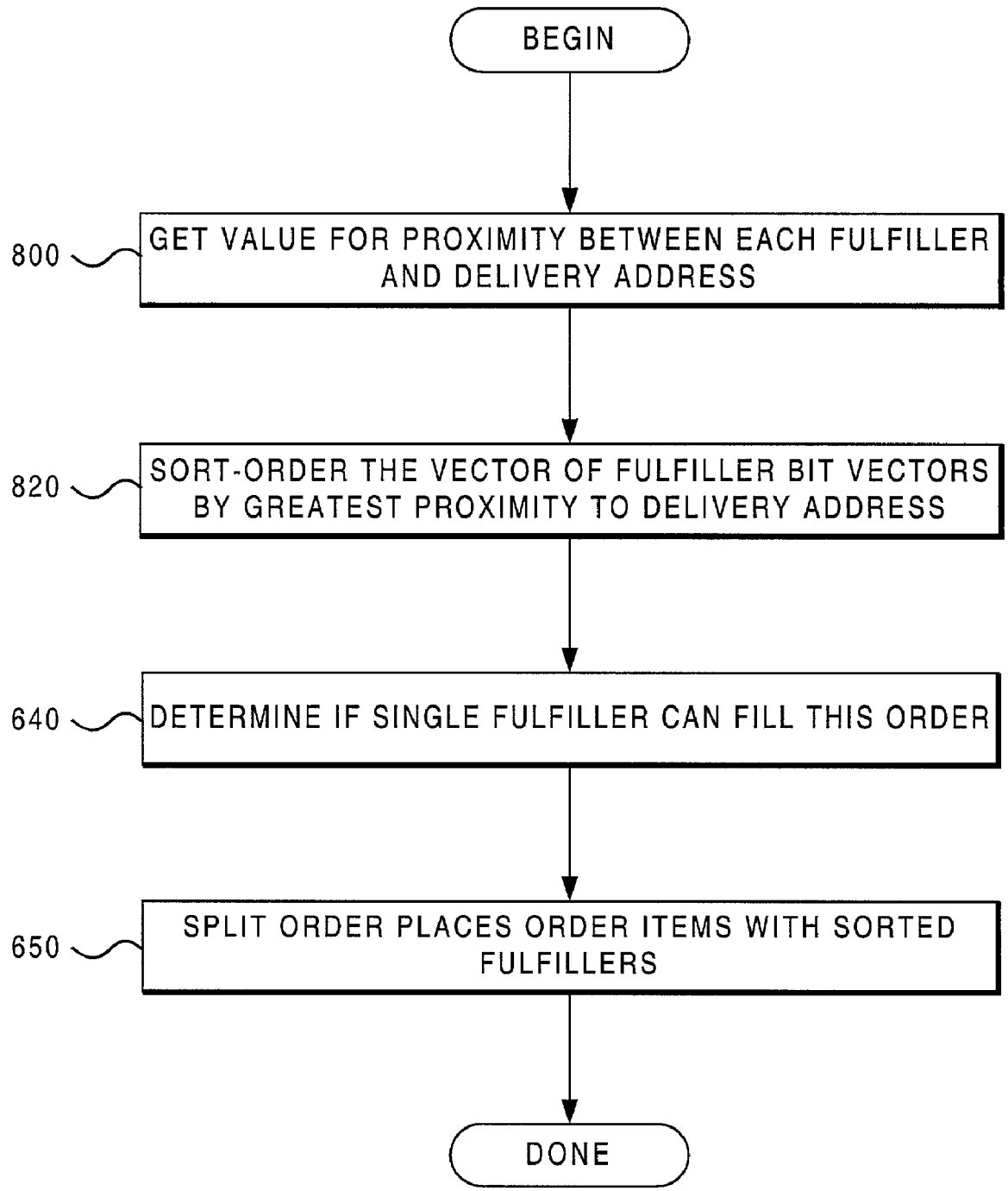
FIG. 8 is a flowchart illustrating a method for minimizing shipping costs by placing order items with fulfillers geographically nearest to the delivery address.

FIG. 8 is a flowchart illustrating the methodology of the preferred embodiment processing arbitrary logic to arrive at an optimized fulfillment schedule for an order. FIG. 8 describes the middleman method for minimizing shipping costs by placing order items with fulfillers geographically nearest to the delivery address. Minimizing shipping distance lowers shipping costs. At step 800, the geographical proximity of each fulfiller to the delivery address is calculated. This method utilizes the zip code prefixes and corresponding postal zones as devised by the United States Postal Service. These prefixes typically comprise the three most significant digits of a zip code and define rather distinct geographical locations. Since localities in the United States are parceled into postal zones designated by zip codes, utilization of zip code prefixes readily provides a means for identifying any geographical location in the country.

At step 820, a method ranks fulfillers according to their proximity to the delivery address of a sub-order shipment. The fulfiller vector, AllFByProximity[ ], is sort-ordered from the least distant shipping route (to the delivery address) to the most distant. The proximity values are calculated as follows. First (for the continental United States), the numeric shipping zone (i.e., the above-mentioned United States Postal Service-designated shipping zones) of the delivery address is calculated using that address's zip code. The numeric shipping zone of the each fulfiller was already fetched from the database. Now the two endpoints of a shipping route, both the fulfiller and the delivery address, are represented by an integer in the set of shipping zones, 0-9. Adjacent zones have successive zone values. Second, the numeric difference between the value of the delivery address shipping zone and the value of a fulfiller's shipping zone is the fulfiller's proximity value. The lower that numeric difference, the greater the fulfiller's proximity. For example, addresses in zone 2 have the highest proximity to fulfillers also in zone 2. Their proximity values would be 0. The next highest proximity for addresses in zone 2 would be both zone 1 and zone 3. Third, in determining the proximity value for a fulfiller in another zone, the value of the shipping zone of the delivery address is both incremented/decremented to test for "next best proximity." In this example, the fulfiller's shipping zone value (2) would be compared with zone 1 and then with zone 3. Fourth would be an iteration of the previous step, but the already incremented/decremented delivery address zones are yet again incremented/decremented. In this example, the fulfiller's shipping zone value (2) would be compared with zone 0 and then with zone 4.

At step 640, the sort-ordered vector of fulfillers, AllF-ByProximity[ ], is tested to determine if the order can be fulfilled by a single fulfiller: Each fulfiller bit vector is processed with the order bit vector with a "bitwise &" operation to place order items with fulfillers preferred by their proximity. At step 650, the sort-ordered vector of fulfillers' bit vectors, AllFByProximity[ ].bv, is processed as previously described at step 650 in FIG. 6. The fulfillers' vector is created by a byproximity( ) method.

The byProximity( ) method itself may be implemented as follows (shown in Java code).

```
1:   // Return a list of fulfillers ordered by those closest to this
2:   // zipCode
3:   public Vector byProximity (String zipCode) {
4:       int zoneOfZipCode;
5:       Vector vectorOfFulfillers = new Vector( );
6:       Vector fulfillersTmp;
7:       int step = 1;
8:       boolean keepGoing;
9:       int i;
10:
11:      // The first digit of a zip code is the "national area" of the
12:      // country.
13:      // The areas are:
14:      //    0 Northeast         5 Midwest
15:      //    1 NewYork           6 Plains
16:      //    2 MidAtlantic       7 Southwest
17:      //    3 Southeast         8 Western
18:      //    4 GreatLakes        9 Pacific
19:      // This information is not online and I derived it by looking
20:      // at post office maps. So the names may not be correct but it 20:
21:      // it is close enough for postal work.
22:
23:      try {
24:          zoneOfZipCode = Integer.parseInt(zipCode.substring(0, 1));
25:      } catch(Exception e) {
26:          return vectorOfFulfillers; // passed in a malformed zip code
27:      }
28:      fulfillersTmp = Fulfiller.getByZone(zoneOfZipCode);
29:      for (i = 0; i < fulfillersTmp.size( ); i++)
30:          vectorOfFulfillers.addElement (fulfillersTmp.elementAt(i));
31:
32:      while (true) {
33:          keepGoing = false;
34:
35:          // we may get a zone in the middle of the country so we need
36:          // to step away 1 zone at a time to make sure that we get the
37:          // fulfillers closest to this zone
38:
39:          if (zoneOfZipCode + step <= Fulfiller.LAST_ZIP_ZONE) {
40:              fulfillersTmp = Fulfiller.getByZone (ZoneOfZipCode +
                     step);
```

```
-continued

41:         for (i = 0; i < fulfillersTmp.size( ); i++)
42:             vectorOfFulfillers.addElement
                    (fulfillersTmp.elementAt(i));
43:         keepGoing = true;
44:     }
45:
46:     if(zoneOfZipCode – step >= Fulfiller.FIRST_ZIP_ZONE) {
47:         fulfillersTmp = Fulfiller.getByZone
                (ZoneOfZiPCode – step);
48:         for (i = 0; i < fulfillersTmp.Size( ); i++)
49:             vectorOfFulfillers.addElement
                    (fulfillersTmp.elementAt(i));
50:         keepGoing = true;
51:     }
52:
53:     if (keepGoing == true)
54:         step++;
55:     else
56:         break;
57:     } // end while true
58:
59:     return vectorOfFulfillers;
60: }
```

As shown by lines 41 and 48, the method builds a list of who are the fulfiller(s) in the immediate and then neighboring ZIP code regions. The method proceeds to add fulfillers from other ZIP code regions, proceeding from nearest to farthest (from the customer), until all fulfillers have been ranked by proximity.

Appended herewith as Appendix A are source code listings in the Java programming language, providing further description of the present invention. A suitable development environment for compiling Java code is available from a variety of vendors, including Borland Software Corporation (formerly, Inprise Corporation) of Scotts Valley, Calif. and Sun Microsystems of Mountain View, Calif. Appendix A is hereby incorporated by reference.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method to be performed on a computing device for providing improved assignment of product orders to one or more of a plurality of fulfillers, the method comprising:
   receiving an order that requires fulfillment from one or more fulfillers, said order comprising individual order items;
   ranking said plurality of fulfillers from most favorable to least favorable, based on specified criteria;
   evaluating a two-dimensional in-memory data structure, that indicates which of said one or more of the plurality of fulfillers can fulfill which types of said individual order items, to determine whether the order can be fulfilled by a single fulfiller, wherein the two-dimensional in-memory data structure comprises a hash table and is organized based on said ranking;
   extending said two-dimensional data structure into a three-dimensional data structure by having at least one entry based on fulfiller and order item type extended into a bit vector indicating one or more order items for a particular fulfiller and order item type, for the order;
   when all order items of the order can be fulfilled by a single fulfiller, assigning fulfillment of the entire order to the most-favorable fulfiller that can fulfill all order items; otherwise
   splitting the order by assigning fulfillment of individual order items to the most-favorable fulfillers that collectively can fulfill all order items.

2. The method of claim 1, wherein said criteria include minimizing shipping costs for a customer that is to receive the order.

3. The method of claim 1, wherein said criteria include minimizing shipping costs for a middleman who received the order from a customer.

4. The methods of claim 1, wherein said criteria include minimizing shipping costs by minimizing the number of fulfillers used when splitting an order.

5. The method of claim 4, wherein said minimizing shipping costs comprises minimizing the cumulative shipping distances from said multiple fulfillers.

6. The method of claim 1, wherein the specified criteria include successively rotating the fulfillers in a round-robin manner to ensure fairness of selection of otherwise equally-qualified fulfillers.

7. The method of claim 1, further comprising:
   automatically generating a fulfillment request based on how fulfillment has been assigned.

8. A method to be performed on a computing device for providing improved fairness when assigning product orders to one or more of a plurality of fulfillers, the method comprising:
   receiving an order that requires fulfillment from one or more fulfillers, said order comprising individual order items;
   determining desirable attributes for fulfilling the order among a set of two or more available fulfillers;
   ranking the set of fulfillers from most favorable to least favorable, based on said desirable attributes;
   evaluating a two-dimensional in-memory data structure, that indicates which of said one or more of the plurality of fulfillers can fulfill which types of said individual order items, to determine whether the order can be fulfilled by a single fulfiller, wherein the two-dimensional in-memory data structure comprises a hash table and is organized based on said ranking;
   extending said two-dimensional data structure into a three-dimensional data structure by having at least one entry based on fulfiller and order item type extended into a bit vector indicating one or more order items for a particular fulfiller and order item type for the order;
   when all of the order items of the order can be fulfilled by a single fulfiller, assigning the order to the most-favorable fulfiller that can fulfill all of the order items; and
   when all of the order items of the order cannot be fulfilled by a single fulfiller, assigning the order to a subset comprising the most-favorable fulfillers that, collectively, can fulfill all order items of the order.

9. The method of claim 8, wherein said desirable attributes include minimizing shipping costs for a customer that is to receive the order.

10. The method of claim 8, wherein said desirable attributes include minimizing shipping costs for a middleman who received the order from a customer.

11. The methods of claim 8, wherein said desirable attributes include minimizing shipping costs by minimizing the number of fulfillers used when splitting an order.

12. The method of claim 11, wherein said minimizing shipping costs comprises minimizing the cumulative shipping distances from said fulfillers.

13. The method of claim 8, wherein the desirable attributes include successively favoring different fulfillers by rotating the fulfillers in a round-robin manner, thereby ensuring fairness of selection of otherwise equally-qualified fulfillers.

14. The method of claim 8, further comprising:
automatically generating a fulfillment request based on how fulfillment has been assigned.

15. The method of claim 8, wherein each fulfiller is a selected one of a distributor, supplier, vendor, manufacturer, or service bureau.

16. A method to assign product orders to one or more of a plurality of fulfillers, the method comprising:
receiving an order comprising individual order items, each order item having an item type;
ranking the plurality of fulfillers from most favorable to least favorable, based on one or more desirable attributes;
evaluating a two-dimensional in-memory data structure, that indicates which of said one or more of the plurality of fulfillers can fulfill which item type, to determine whether the order can be fulfilled by a single fulfiller, wherein the two-dimensional in-memory data structure comprises a hash table organized based on said ranking;
generating a three-dimensional data structure by having at least one entry based on fulfiller and item type extended into a bit vector indicating one or more order items from the order;
when all of the order items of the order can be fulfilled by a single fulfiller, assigning the order to the most-favorable fulfiller that can fulfill all of the order items; and
when all of the order items of the order cannot be fulfilled by a single fulfiller, assigning the order to a subset comprising the most-favorable fulfillers that, collectively, can fulfill all order items of the order.

* * * * *